(12) United States Patent
Dunbar et al.

(10) Patent No.: US 12,476,896 B2
(45) Date of Patent: Nov. 18, 2025

(54) OPTIMIZING NETWORK DELIVERY OF 5G EDGE APPLICATION SERVICES

(71) Applicant: Huawei Technologies Co., Ltd., Shenzhen (CN)

(72) Inventors: Linda Dunbar, Plano, TX (US); Haoyu Song, Plano, TX (US); Kaippallimalil Mathew John, Plano, TX (US); Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 18/304,016

(22) Filed: Apr. 20, 2023

(65) Prior Publication Data

US 2023/0300060 A1 Sep. 21, 2023

Related U.S. Application Data

(63) Continuation of application No. PCT/US2021/055993, filed on Oct. 21, 2021.
(Continued)

(51) Int. Cl.
*H04L 45/121* (2022.01)
*H04L 45/02* (2022.01)
*H04L 47/125* (2022.01)

(52) U.S. Cl.
CPC ............ *H04L 45/121* (2013.01); *H04L 45/04* (2013.01); *H04L 47/125* (2013.01)

(58) Field of Classification Search
CPC ......... H04L 45/50; H04L 45/22; H04L 45/24; H04L 45/745; H04L 47/125; H04L 45/04; H04L 45/64; H04L 47/70; H04L 43/0876; H04L 47/10; H04L 45/00; H04L 45/125; H04L 45/02; H04L 45/586; H04L 12/4641; H04L 45/123; H04L 45/124; H04L 41/0896; H04L 45/12; H04L 45/121; H04L 41/12; H04L 43/0864; H04L 43/16; H04L 45/16; H04L 12/4633; H04L 45/28; H04L 41/22; H04L 41/40; H04L 47/20;
(Continued)

(56) References Cited

U.S. PATENT DOCUMENTS

2012/0307825 A1* 12/2012 Hui ........................ H04W 40/36
370/410
2014/0254374 A1* 9/2014 Janakiraman ........... H04L 45/66
370/235
(Continued)

OTHER PUBLICATIONS

Ceccarelli, et al,, "Generalized SCSI: A Generic Structure for Interface Switching Capability Descriptor (ISCD) Switching Capability Specific Information (SCSI)," RFC 8258, Oct. 2017, 7 pages.
(Continued)

*Primary Examiner* — Djenane M Bayard
(74) *Attorney, Agent, or Firm* — Conley Rose, P.C.

(57) ABSTRACT

A method and apparatus for optimizing network delivery of fifth generation (5G) edge application services by weighting network latency along with a load, capacity, and preference of an application server to determine where to transmit a new flow of packets. By using the weighted approach, network traffic can be equalized among multiple instances (e.g., applications) with the same address.

22 Claims, 7 Drawing Sheets

Related U.S. Application Data

(60) Provisional application No. 63/104,285, filed on Oct. 22, 2020, provisional application No. 63/094,673, filed on Oct. 21, 2020.

(58) Field of Classification Search
CPC ............ H04L 47/2441; H04L 43/0811; H04L 47/762; H04L 41/0213; H04L 47/12; H04L 45/507; H04L 47/2408; H04L 63/1458; H04L 2212/00; H04L 67/1001; H04L 2463/146; H04L 45/32; H04L 47/724; H04L 47/781; H04L 47/783; H04L 47/801; H04L 47/822; H04L 63/1416; H04L 41/5009; H04L 41/5022; H04L 41/5045; H04L 45/03; H04L 45/033; H04L 45/128; H04L 67/1004; H04L 12/28; H04L 41/0677; H04L 41/5074; H04L 43/0817; H04L 45/46; H04L 47/22; H04L 47/50; H04L 47/785; H04L 63/105; H04L 41/0826; H04L 41/145; H04L 45/06; H04L 45/14; H04L 45/18; H04L 45/30; H04L 45/38; H04L 45/48; H04L 45/54; H04L 45/74; H04L 47/17; H04L 63/0428; H04L 63/061; H04L 63/162; H04L 69/325; H04L 9/0827
See application file for complete search history.

(56) References Cited

U.S. PATENT DOCUMENTS

| | | | |
|---|---|---|---|
| 2019/0104413 A1* | 4/2019 | Cidon | H04L 41/22 |
| 2020/0267086 A1* | 8/2020 | Sawyer | H04L 47/22 |
| 2020/0366592 A1* | 11/2020 | Ehrat | H04L 45/44 |

OTHER PUBLICATIONS

Wang, "An Architecture of HIghly Available Services Using Anycast and Segment Routing in IPV6," NAN)G 77, https://www.youtube.com/watch?v=kpx8u8bClzs, Nov. 5, 2019, 2 pages.

Sha Yuan et al."A future anycast routing scheme for Information-Centric Network", 2012 18th Asia-Pacific Conference on, Oct. 15, 2012, total 6 pages.

\* cited by examiner

OPTIMIZING NETWORK DELIVERY OF 5G EDGE APPLICATION SERVICES

CROSS-REFERENCE TO RELATED APPLICATIONS

This patent application is a continuation of International Application No. PCT/US2021/055993 filed on Oct. 21, 2021, by Futurewei Technologies, Inc., and titled "Optimizing Network Delivery of 5G Edge Application Services," which claims the benefit of U.S. Provisional Patent Application No. 63/094,673 filed Oct. 21, 2020 by Futurewei Technologies, Inc., and titled "Methods and Algorithms to Optimize Network Delivery For Encrypted 5G Edge Application Services," and U.S. Provisional Patent Application No. 63/104,285 filed Oct. 22, 2020 by Futurewei Technologies, Inc., and titled "Network Protocol Extension For 5G Edge Computing Services," each of which is hereby incorporated by reference.

TECHNICAL FIELD

The present disclosure is generally related to the field of telecommunications and, in particular, to delivery of application services to a user over a telecommunication network.

BACKGROUND

In a fifth generation (5G) edge computing environment, an application can be provided by various application servers in different local data networks (LDNs) (a.k.a., edge computing data centers). The LDNs are often in close proximity to, or even co-located with, 5G sites as well as being in close proximity to each other in order to meet the goal of minimizing latency and optimizing the user experience.

When a user equipment (UE) initiates application packets (or simply, packets) using a destination from a domain name service (DNS) reply or from the UE's cache, the packets from the UE are carried in a protocol data unit (PDU) session through a 5G core to a 5G User Plane Function (UPF) PDU session anchor (PSA). The PSA decapsulates the 5G general packet radio service (GPRS) Tunneling Protocol (GTP) outer header and forwards the packets to an ingress router of the LDN. The LDN is responsible for forwarding the packets to the intended destinations.

5G sites are coupled to the different LDNs via an Internet Protocol (IP) network. Routers in the IP network attempt to select the best application server to service requests from the UE. However, selecting the best application server can be a difficult undertaking.

SUMMARY

The disclosed aspects/embodiments provide techniques for optimizing network delivery of 5G edge application services by weighting network latency along with a load, capacity, and preference of an application server to determine where to transmit a new flow of packets. By using the weighted approach, network traffic can be equalized among multiple instances (e.g., applications) with the same address.

A first aspect relates to a first ingress router, comprising: a memory configured to store instructions; and one or more processors configured to execute the instructions to cause the first ingress router to: receive a flow associated with an anycast address; determine a first internet protocol (IP) layer metric corresponding to a first application server with the anycast address and a second IP layer metric corresponding to a second application server with the anycast address, wherein the first IP layer metric comprises a first network latency, a first load measurement, a first capacity index, and a first network preference, and wherein the second IP layer metric comprises a second network latency, and a second load measurement, a second capacity index, and a second network preference; and compute a cost of reaching the first application server and the second application server in accordance with the first IP layer metric and the second IP layer metric; and select a path from a first path connected to the first application server and a second path connected to the second application server based on the cost computed.

Optionally, in any of the preceding aspects, another implementation of the aspect provides that the one or more processors are further configured to execute the instructions to cause the first ingress router to: receive a first border gateway protocol (BGP) message comprising at least part of the first IP layer metric from a first egress router connected by the first path to the first application server.

Optionally, in any of the preceding aspects, another implementation of the aspect provides that the one or more processors are further configured to execute the instructions to cause the first ingress router to: receive a second border gateway protocol (BGP) message comprising at least part of parameters of the second IP layer metric from a second egress router connected by the second path to the second application server.

Optionally, in any of the preceding aspects, another implementation of the aspect provides that wherein the one or more processors configured to execute the instructions to cause the first ingress router to: receive a second border gateway protocol (BGP) message comprising at least part of parameters of the second IP layer metric from an ingress router of the second path.

Optionally, in any of the preceding aspects, another implementation of the aspect provides that the cost is determined according to:

$$\frac{\alpha L_j \beta_i}{L_i \beta_j} + \frac{(1-\alpha) D_j \gamma_i}{D_i \gamma_j}$$

where $\alpha$ represents the weighting factor and has a value between zero and one, $L_i$ represents the first load measurement, $L_j$ represents the second load measurement, $\beta_i$ represents the first capacity index, $\beta_j$ represents the second capacity index, $D_i$ represents the first network latency, $D_j$ represents the second network latency, $\gamma_i$ represents the first network preference, $\gamma_1$ represents the second network preference.

Optionally, in any of the preceding aspects, another implementation of the aspect provides that the first network latency and the second network latency each comprise a round trip time (RTT).

Optionally, in any of the preceding aspects, another implementation of the aspect provides that the first network latency and the second network latency are each measured by an ingress router of a corresponding path of the first path and the second path.

Optionally, in any of the preceding aspects, another implementation of the aspect provides that the first network latency and the second network latency are each measured by an egress router of a corresponding path of the first path and the second path.

Optionally, in any of the preceding aspects, another implementation of the aspect provides that the first load measurement and the second load measurement each comprise a weighted combination of a total number of packets sent by an egress node to an application server, the total number of packets received by the egress node from the application server, a total number of bytes sent by the egress node to the application server, and the total number of bytes received by the egress node from the application server.

A second aspect relates to a method of routing implemented by a first ingress router, comprising: receiving a flow associated with an anycast address; determining a first internet protocol (IP) layer metric corresponding to a first application server with the anycast address and a second IP layer metric corresponding to a second application server with the anycast address, wherein the first IP layer metric comprises a first network latency, a first load measurement, a first capacity index, and a first network preference, and wherein the second IP layer metric comprises a second network latency, and a second load measurement, a second capacity index, and a second network preference; computing a cost of reaching the first application server and the second application server in accordance with the first IP layer metric and the second IP layer metric; and selecting a path from a first path connected to the first application server and a second path connected to the second application server based on the cost computed.

Optionally, in any of the preceding aspects, another implementation of the aspect provides that receiving a first border gateway protocol (BGP) message comprising at least part of the first IP layer metric from a first egress router connected by the first path to the first application server.

Optionally, in any of the preceding aspects, another implementation of the aspect provides that receiving a second border gateway protocol (BGP) message comprising at least part of the second IP layer metric from a second egress router connected by the second path to the second application server.

Optionally, in any of the preceding aspects, another implementation of the aspect provides that receiving a second border gateway protocol (BGP) message comprising at least part of the second IP layer metric from an ingress router of the second path.

Optionally, in any of the preceding aspects, another implementation of the aspect provides that the cost is determined according to:

$$\frac{\alpha L_j \beta_i}{L_i \beta_j} + \frac{(1-\alpha)D_j \gamma_i}{D_i \gamma_j}$$

where $\alpha$ represents the weighting factor and has a value between zero and one, $L_i$ represents the first load measurement, $L_j$ represents the second load measurement, $\beta_i$ represents the first capacity index, $\beta_j$ represents the second capacity index, $D_i$ represents the first network latency, $D_j$ represents the second network latency, $\gamma_i$ represents the first network preference, $\gamma_1$ represents the second network preference.

Optionally, in any of the preceding aspects, another implementation of the aspect provides that the first network latency and the second network latency each comprise a round trip time (RTT).

Optionally, in any of the preceding aspects, another implementation of the aspect provides that the first network latency and the second network latency are each measured by an ingress router of a corresponding path of the first path and the second path.

Optionally, in any of the preceding aspects, another implementation of the aspect provides that the first network latency and the second network latency are each measured by an egress router of a corresponding path of the first path and the second path.

Optionally, in any of the preceding aspects, another implementation of the aspect provides that the first load measurement and the second load measurement each comprise a weighted combination of a total number of packets sent by an egress node to an application server, the total number of packets received by the egress node from the application server, a total number of bytes sent by the egress node to the application server, and the total number of bytes received by the egress node from the application server.

A third aspect relates to first egress router, comprising: a memory configured to store instructions; and one or more processors configured to execute the instructions to cause the first egress router to: determine a first load measurement of a first application server attached to the first egress router; determine a first capacity index of the first application server attached to the first egress router; determine a first network preference corresponding to the first egress router; and transmit the first load measurement, the first capacity index, and the first network preference toward a first ingress router.

Optionally, in any of the preceding aspects, another implementation of the aspect provides that the first load measurement, the first capacity index, and the first network preference are transmitted in a type length value (TLV) structure.

Optionally, in any of the preceding aspects, another implementation of the aspect provides that a load measurement subTLV structure in the TLV structure contains a total number of packets sent by an egress node to an application server, the total number of packets received by the egress node from the application server, a total number of bytes sent by the egress node to the application server, and the total number of bytes received by the egress node from the application server.

Optionally, in any of the preceding aspects, another implementation of the aspect provides that the first load measurement comprises a weighted combination of a total number of packets sent by an egress node to an application server, the total number of packets received by the egress node from the application server, a total number of bytes sent by the egress node to the application server, and the total number of bytes received by the egress node from the application server.

A fourth aspect relates to a method of routing implemented by a first egress router, comprising: determining a first load measurement of a first application server attached to the first egress router; determining a first capacity index of the first application server attached to the first egress router; determining a first network preference corresponding to the first egress router; and transmitting the first load measurement, the first capacity index, and the first network preference toward a first ingress router.

Optionally, in any of the preceding aspects, another implementation of the aspect provides that the first load measurement, the first capacity index, and the first network preference are transmitted in a type length value (TLV) structure.

Optionally, in any of the preceding aspects, another implementation of the aspect provides that a load measurement subTLV structure in the TLV structure contains a total number of packets sent by an egress node to an application server, the total number of packets received by the egress node from the application server, a total number of bytes sent by the egress node to the application server, and the total number of bytes received by the egress node from the application server.

Optionally, in any of the preceding aspects, another implementation of the aspect provides that the first load measurement comprises a weighted combination of a total number of packets sent by an egress node to an application server, the total number of packets received by the egress node from the application server, a total number of bytes sent by the egress node to the application server, and the total number of bytes received by the egress node from the application server.

A fifth aspect relates to a first ingress router, comprising: memory means configured to store instructions; and processing means configured to execute the instructions to cause the first ingress router to perform any of the disclosed embodiments.

A sixth aspect relates to a first egress router, comprising: memory means configured to store instructions; and processing means configured to execute the instructions to cause the first egress router to perform any of claims of any of the disclosed embodiments.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
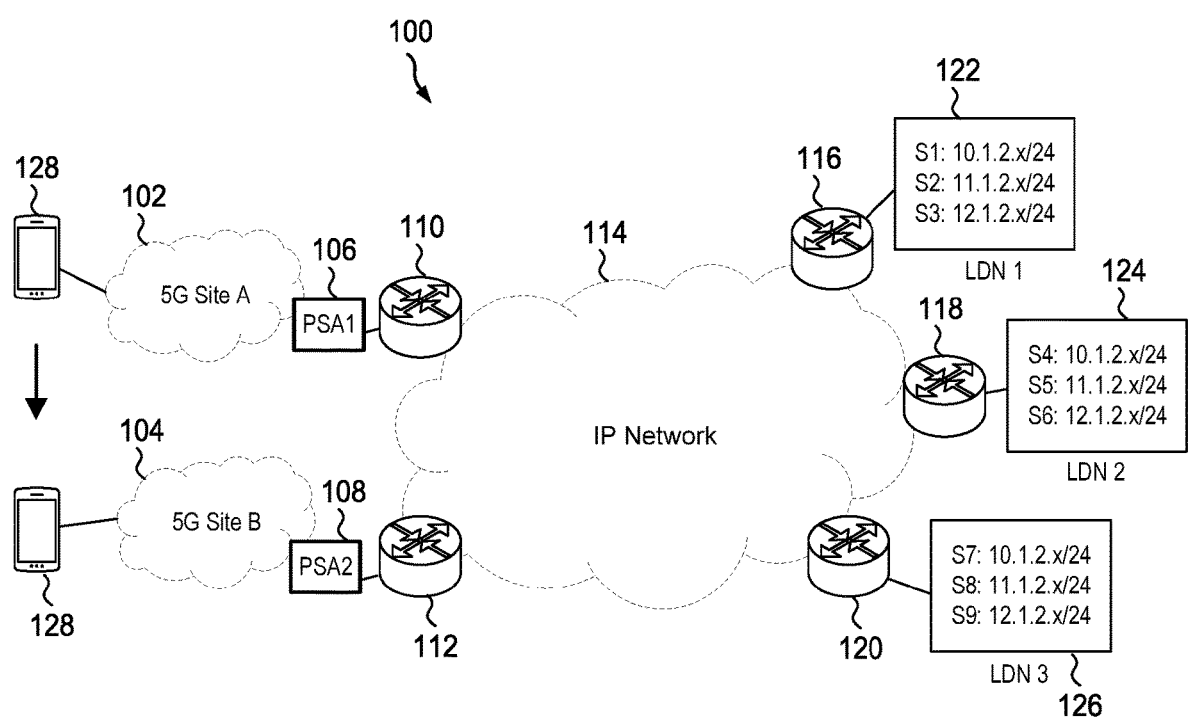
FIG. 1 is a schematic diagram of a telecommunication network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As noted above, routers in the IP network are tasked with selecting the best application server to service requests from the UE. In some cases, the routers simply chose the application server which is closest to the UE. For example, each time that a packet of data moves from one router (or device) to another, that is considered to one be one "hop." Thus, the application server which is the fewest number of hops away from the UE is chosen. However, using distance alone as the metric to select the best application server may not be desirable when there are other application servers in close proximity. Indeed, there is no guarantee that the closest application server will be able to provide the best user experience (e.g., lowest latency, etc.).

Routers can also rely on DNS to select the optimal application server to service requests from the UE. However, use of DNS may also have drawbacks. For example, DNS can be used to provide the address of the application server closest to the requesting UE. However, the requesting UE can cache the address indefinitely. Therefore, when the UE moves to another 5G site, which may be far away, the cached address may still be used. Thus, the UE may experience an undesirable latency (a.k.a., network delay).

In addition, the application server identified by DNS may be overloaded. As such, the application server may be slow to respond to requests from the UE, or may provide no response at all. This is an unfortunate result, especially when there are other available application servers in close proximity and able to provide the requested application to the UE.

Anycast is a network addressing and routing methodology in which a single destination IP address is shared by different devices (e.g., application servers) in multiple locations. Routers direct packets addressed to the single destination IP address to the application server nearest the sender. As used herein, nearest means the application server which is reachable with the lowest number of hops (e.g., border gateway protocol (BGP) network hops). Anycast routing is widely used by content delivery networks such as web and DNS hosts to bring their content closer to end users.

Anycast is increasingly used by application providers and content delivery networks (CDNs) because Anycast makes dynamic load balancing among different application servers based on network conditions possible. However, using Anycast to select an application server can result in an overloaded application server being selected when there are other available application servers in close proximity and able to provide the requested application to the UE. This can occur in a 5G environment where UEs frequently move from one 5G site to another.

Disclosed herein are techniques for optimizing network delivery of 5G edge application services by weighting network latency along with a load, capacity, and preference of an application server to determine where to transmit a new flow of packets. By using the weighted approach, network traffic can be equalized among multiple instances (e.g., applications) with the same address.

The disclosure assumes that most application traffic is encrypted, and application servers don't expose their internal information for security reasons. In addition, the disclosure is about networks using their own probes and measurement to achieve optimized traffic distribution to instances of a specific ANYCAST (a.k.a., Anycast or anycast) application.

The disclosure includes utilizing network's Routing & innovative measurements and probing to estimate traffic load to difference instances of anycast address without the application cooperation. The disclosure includes techniques to discover edge routers that are closest to a specific anycast instances. The disclosure includes techniques to incorporate the innovative measurements with routing dynamically direct application flows to less loaded instances. The disclosure includes techniques to optimize the distribution of encrypted applications traffic to their anycast instances. The disclosure includes techniques to use underlay network internal information to better balance the load among multiple instances of Application servers. Some Application servers have their own load balancers to distribute load to multiple instances. However, Application's own load balancers has many problems, such as the App Load Balancer itself becomes the bottleneck, and the network congestion to the selected App Load Balancer can worsen the performance. The disclosure includes techniques to use intelligent steering of the user traffic of application server instances through the network segments based on the innovative network measurements to achieve the optimal end to end performance.

FIG. 1 is a schematic diagram of a telecommunication network 100. As shown, the telecommunications network 100 includes a first 5G Site 102 (5G Site A), a second 5G Site 104 (5G Site B), a first PSA 106 (PSA1), a second PSA 108 (PSA2), a first ingress router 110, a second ingress router 112, an IP network 114, a first egress router 116, a second egress router 118, a third egress router 120, a first LDN 122 (LDN 1), a second LDN 124 (LDN 2), and a third LDN 126 (LDN 3). It should be recognized that the telecommunications network 100 may include additional components in practical applications. Notably, a 5G PSA (PDU Session Anchor) might be a server blade not capable of routing. Then there should be a separate router directly connected to the PSA as the ingress router to the Local Data Network (LDN). For the ease of description, this document uses PSA to represent the combination of 5G PSA+Ingress Router to the LDN.

The first 5G Site 102, which may be referred to as a 5G core network, includes the first PSA 106 and one or more base stations (not shown). The first PSA 106 represents a User Plane Function (UPF), which terminates the N6 interface of a PDU session within the first 5G Site 102. The base stations may be, for example, a nodeB or an evolved nodeB (eNB) configured to communicate with a UE 128. The UE 128 may be a mobile phone (a.k.a., cellular phone, smart phone), smart tablet, smart watch, or other electronic device configured with cellular communication equipment. The first PSA 106 is in communication with the first ingress router 110. In an embodiment, the first PSA 106 is disposed with, or co-located, with the first ingress router 110.

The second 5G Site 104 includes the second PSA 108 and one or more base stations (not shown). The second PSA 108 represents the UPF, which terminates the N6 interface of a PDU session within the second 5G Site 104. The base stations may be, for example, a nodeB or an evolved nodeB (eNB) configured to communicate with the UE 128. The second PSA 108 is in communication with the second ingress router 110. In an embodiment, the second PSA 108 is disposed with, or co-located, with the second ingress router 112.

The first ingress router 110, the second ingress router 112, the first egress router 116, the second egress router 118, and the third egress router 120 are able to communicate with each other via the IP network 114. The IP network 114 is a communication network that uses Internet Protocol (IP) to send and receive messages between connected devices (e.g., routers, computers, servers, etc.). As one of the most commonly used global networks, an IP network is implemented in Internet networks, local area networks (LAN), and enterprise networks. Hosts or network nodes in the IP network are typically configured with the Transmission Control Protocol (TCP)/IP suite.

The first ingress router 110 and the second ingress router 120 may be collectively referred to as a neighbor group. While two ingress routers (e.g., first ingress router 110 and the second ingress router 112) are depicted in FIG. 1, it should be recognized that more or fewer ingress routers may be included in practical applications.

The first egress router 116 is disposed between the IP network 114 and the first LDN 122. Thus, the first egress router 116 is able to pass service requests received from the first ingress router 110 or the second ingress router 112 over the IP network 114 on to the first LDN 122. The second egress router 118 is disposed between the IP network 114 and the second LDN 124. Thus, the second egress router 118 is able to pass service requests received from the first ingress router 110 or the second ingress router 112 over the IP network 114 on to the second LDN 124. The third egress router 120 is disposed between the IP network 114 and the third LDN 126. Thus, the third egress router 120 is able to pass service requests received from the first ingress router 110 or the second ingress router 112 over the IP network 114 on to the third LDN 126.

The first egress router 116, the second egress router 118, and the third egress router 120 may be collectively referred to as a neighbor group. While three egress routers (e.g., first egress router 116, second egress router 118, and third egress router 120) are depicted in FIG. 1, it should be recognized that more or fewer egress routers may be included in practical applications.

Notably, the first egress router 116, the second egress router 118, and the third egress router 120 would be considered an ingress router from the perspective of the first LDN 122, the second LDN 124, and the third LDN 126. Likewise, the first ingress router 110 and the second ingress router 112 would be considered an egress router from the perspective of the first LDN 122, the second LDN 124, and the third LDN 126.

The first LDN 122 hosts a plurality of application servers (a.k.a., Anycast servers), which are represented by the designations S1, S2, and S3. As shown, the application server S1 is configured to provide the application associated with address 10.1.2.x/24, the application server S2 is configured to provide the application associated with address 11.1.2.x/24, and the application server S3 is configured to provide the application associated with address 12.1.2.x/24.

The second LDN 124 hosts a plurality of application servers, which are represented by the designations S4, S5, and S6. As shown, the application server S4 is configured to provide the application associated with address 10.1.2.x/24, the application server S5 is configured to provide the application associated with address 11.1.2.x/24, and the application server S6 is configured to provide the application associated with address 12.1.2.x/24.

The third LDN 126 hosts a plurality of application servers, which are represented by the designations S7, S8, and S9. As shown, the application server S7 is configured to provide the application associated with address 10.1.2.x/24, the application server S8 is configured to provide the application associated with address 11.1.2.x/24, and the application server S8 is configured to provide the application associated with address 12.1.2.x/24. The first LDN 122, the second LDN 124, and the third LDN 126 may be collectively referred to as a neighbor group.

From the foregoing, it should be recognized that the application server S1, S4, and S7 all provide the same application despite being disposed in different LDNs. In addition, the application server S2, S5, and S8 all provide the same application despite being disposed in different LDNs. Likewise, the application server S3, S6, and S9 all provide the same application despite being disposed in different LDNs. While three application servers are depicted in each LDN, more or fewer applications may be included in each LDN in practical applications. In addition, in practical applications the telecommunications network 100 may include more or fewer LDNs.

Most applications today have multiple server instances located in different regions or different edge data centers reachable by 5G Local Data Networks. Application server instances may not respond to messages initiated by network devices and the application communications might be encrypted. Therefore, it cannot be assumed that application server instances can respond to a network ping or Internet control message protocol (ICMP) query messages initiated by routers or network gears.

Then, the closest measurement of the network delay to reach the application servers is by measuring the delay between ingress router (or 5G PSA) and the router where the application server instances are directly attached. In the present disclosure, the term "Application Instance Egress Router" (AIER) is used to describe the last router that the application instance is attached.

As shown in FIG. 1, the UE 128 may migrate or move from the first 5G Site 102 to the second 5G site. When this occurs, the second ingress router 112 is tasked with selecting the appropriate application server to service requests. As noted above, simply selecting the closest application server may be less than ideal. For example, when the second ingress router 112 simply selects the closest application server (e.g., the application server reachable over the fewest hops), the UE may experience network latency when the closest application server is overloaded or the path to the closest application server is congested.

Figure 2:
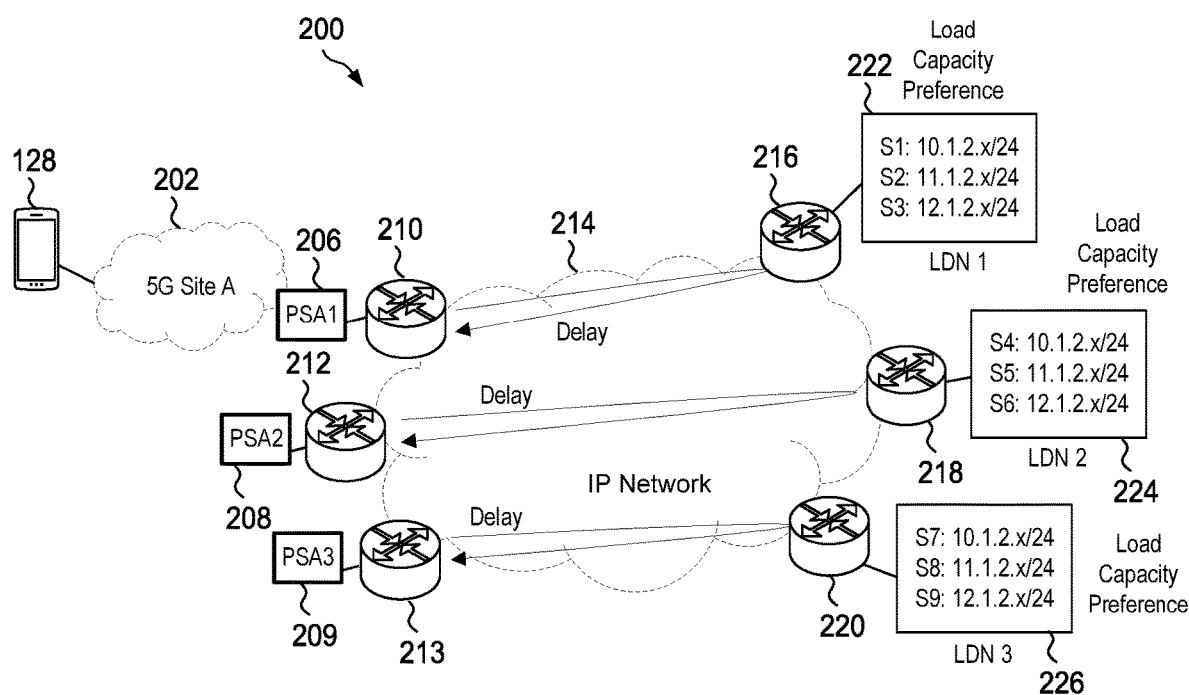
FIG. 2 is a schematic diagram of a telecommunication network according to an embodiment of the disclosure.

FIG. 2 is a schematic diagram of a telecommunication network 200 according to an embodiment of the disclosure. As shown, the telecommunications network 200 includes a first 5G Site 202 (5G Site A), a first PSA 206 (PSA1), a second PSA 208 (PSA2), a third PSA 209 (PSA 3), a first ingress router 210, a second ingress router 212, a third ingress router 213, an IP network 214, a first egress router 216, a second egress router 218, a third egress router 220, a first LDN 222 (LDN 1), a second LDN 224 (LDN 2), and a third LDN 226 (LDN 3). It should be recognized that the telecommunications network 200 may include additional components in practical applications.

The first 5G Site 202 in FIG. 2 is similar to the first 5G Site 102 in FIG. 1. While not shown for ease of illustration, each of the second PSA 208 and the third PSA 209 would also be included in a 5G Site in practical applications. The first PSA 206, the second PSA 208, and the third PSA 209 in FIG. 2 are similar to the first PSA 106 and the second PSA 108 in FIG. 1. The first ingress router 210, the second ingress router 212, and the third ingress router 213 in FIG. 2 are similar to the first ingress router 110 and the second ingress router 112 in FIG. 1. The IP network 214 in FIG. 2 is similar to the IP network 114 in FIG. 1. The first egress router 216, the second egress router 218, and the third egress router 220 in FIG. 2 are similar to the first egress router 116, the second egress router 118, and the third egress router 120 in FIG. 1. The first LDN 222, the second LDN 224, and the third LDN 226 in FIG. 2 are similar to the first LDN 122, the second LDN 124, and the third LDN 126 in FIG. 1. Therefore, for the sake of brevity, a detailed description of these elements in FIG. 2 is not repeated.

When a new flow of packets, associated with an anycast address (IP address), arrives at the first ingress router 210 from the UE 128, the first ingress router 210 is tasked with determining where to forward the new flow of packets. As used herein, a new flow of packets begins when the UE 128 makes a request for a new application (e.g., when the UE 128, which has been using the application associated with 10.1.2.x/24, now requests the application associated with 12.1.2.x/24). Instead of simply selecting the closest application server having the requested application, the ingress router 210 selects the "best" or "optimal" egress router coupled to the application server with the requested application. The first ingress router 210 selects the best or optimal egress router (e.g., the first egress router 216, the second egress router 218, or the third egress router 220) by accounting for the network latency between the ingress router and the egress router, and by considering the load, capacity, and/or preference of the application server with the requested application, as will be more fully explained below.

The first ingress router 210 periodically measures network latency (a.k.a., delay) between the first ingress router 210 and the first egress router 216, which is attached to the application server with the requested application (e.g., S1). The network latency refers to the amount of time needed for a signal to be transmitted from the first ingress router 210 to the first egress router 216 plus the amount of time needed for an acknowledgement of receipt of the signal by the first egress router 216 to be received by the first ingress router 210. The network latency may be referred to as the round trip time (RTT). In an embodiment, the network latency represents an average network latency over the period.

The first network router 210 also receives, from the first egress router 216, a load measurement, a capacity index, and a network preference each corresponding to the application server with the requested application (e.g., S1). In an embodiment, the load measurement comprises a weighted combination of a total number of packets sent by an egress node (e.g., the first egress node 216) to an application server (e.g., S1), the total number of packets received by the egress node from the application server, the total number of bytes sent by the egress node to the application server, and the total number of bytes received by the egress node from the application server. In an embodiment, the load measurement represents an average load measurement over a measurement cycle.

In an embodiment, the load measurement is based on the following formula:

$$load = w1*ToPackets + w2*FromPackets + w3*ToBytes + w4*FromBytes$$

where load represents the load measurement, where w1, w2, w3, and w4 are each weighting factors, where ToPackets is the total number of packets sent by an egress node to an application server, where FromPackets is the total number of packets received by the egress node from the application server, where ToBytes is the total number of bytes sent by the egress node to the application server, and where From- Bytes is the total number of bytes received by the egress node from the application server. Notably, each of the weights may have a different value. In an embodiment, each of the weights has a value between zero and one (e.g., 0<wi<1, where i is 1, 2, 3, or 4). In an embodiment, w1+w2+w3+w4=1. In an embodiment, one or more of the weights is provided by a network administrator. In an embodiment, one or more of the weights is based on user feedback or based on self-learning.

The capacity index represents a capacity of the application server (e.g., S1). As used herein, the capacity refers to the ability of the application server to process service requests. The capacity may be determined based on the processing power of the application server, the speed of the application server, and so on. The higher the value of the capacity index, the higher the capacity of the application server. The lower the value of the capacity index, the lower the capacity of the application server.

The network preference represents a preference of an application server (e.g., S1). The network preference of one server (e.g., S1) may be relative to the network preference of another application server (e.g., S4). The higher the value of the network preference, the higher the preference of the application server. The lower the value of the network preference, the lower the preference of the application server.

The second ingress router 212 and the third ingress router 213 also periodically measure network latency and receive, from an egress router (e.g., the second egress router 218 and the third egress router 220), a load measurement, a capacity index, and a network preference each corresponding to the application server with the requested application (e.g., S4, S7).

Assuming the second ingress router 212 and the third ingress router 213 are in a same neighbor group with the first ingress router 210 and that each router can each reach a different Anycast server (e.g., S1, S4, S7, etc.) providing the same application, the first ingress router 210, the second ingress router 212, and the third ingress router 213 each share their network latency, load measurement, a capacity index, and a network preference with each other. In an embodiment, the first ingress router 210, the second ingress router 212, and the third ingress router 213 periodically transmit their network latency, load measurement, capacity index, and network preference to each other. In an embodiment, each of the first ingress router 210, the second ingress router 212, and the third ingress router 213 store the network latencies, load measurements, capacity indexes, and network preferences in memory for later use.

Once the first ingress router 210 has the various network latencies, load measurements, capacity indexes, and network preferences, the first ingress router 210 is able to determine the best or optimal egress router for the new flow. In an embodiment, the ingress router 210 selects the best or optimal router for the new flow by comparing the cost of reaching each application server (e.g., S1, S4, S7) offering the same service according to the following formula:

$$\text{cost} = \min_j \left\{ \frac{\alpha L_j \beta_i}{L_i \beta_j} + \frac{(1-\alpha)D_j \gamma_i}{D_i \gamma_j} \right\}$$

where α represents the weighting factor and has a value between zero and one, $L_i$ represents the first load measurement, $L_j$ represents the second load measurement, $\beta_i$ represents the first capacity index, $\beta_j$ represents the second capacity index, $D_i$ represents the first network latency, $D_j$ represents the second network latency, $\gamma_i$ represents the first network preference, $\gamma_j$ represents the second network preference, and $\min_j$ represents an egress router j that achieves a minimum cost. In an embodiment, the weighting factor is used to balance a server load with a network preference. In the above formula, $$\frac{\alpha L_j \beta_i}{L_i \beta_j} + \frac{(1-\alpha)D_j \gamma_i}{D_i \gamma_j}$$

represents the cost (identified by cost-j) to reach an App Server attached to Site-j relative to an App Server attached to another site, Site-i.

$$\text{cost} - j = \frac{\alpha L_j \beta_i}{L_i \beta_j} + \frac{(1-\alpha)D_j \gamma_i}{D_i \gamma_j}$$

In an embodiment, the first ingress router 210 selects the best or optimal router for the new flow by comparing the cost of reaching each application server (e.g., S1, S4, S7) offering the same service according to the following simplified formula:

$$\text{cost} = \min_j \left\{ \frac{\alpha L_j \beta_i}{L_i \beta_j} + \frac{(1-\alpha)D_j}{D_i} \right\}$$

where α represents the weighting factor and has a value between zero and one, $L_i$ represents the first load measurement, $L_j$ represents the second load measurement, $D_i$ represents the first network latency, $D_j$ represents the second network latency, and $\min_j$ represents an egress router j that achieves a minimum cost.

An example of how the first ingress router 210 uses the above-noted simplified formula is provided with regard to FIG. 2. The example assumes that the delay between the first ingress router 210 and the second ingress router 212 is the same as the delay between the first ingress router 210 and the third ingress router 213. Therefore, such delay is not included in the calculation.

In FIG. 2, the network latency, $D_i$, between the first ingress router 210 and the first egress router 216 is measured to be 100 microseconds (μs). The network latency, $D_j$, between the second ingress router 212 and the second egress router 218 is measured to be 200 microseconds (μs). The network latency, $D_j$, between the third ingress router 213 and the third egress router 220 is measured to be 150 microseconds (μs). The load measurement, $L_i$, of the first application server S1 providing the requested application is 3,000. The load measurement, $L_j$, of the second application server S4 providing the requested application is 2,000. The load measurement, $L_j$, of the third application server S7 providing the requested application is 1,000. Assume that the weighting factor α is 0.6. Therefore, the first ingress router 210 arrives at the following results:

$$\text{Cost to reach } S1: \text{cost} = \frac{(0.6)3000}{3000} + \frac{(1-0.6)100}{100} = 1 \text{ (the baseline)}$$

$$\text{Cost to reach } S4: \text{cost} = \frac{(0.6)2000}{3000} + \frac{(1-0.6)200}{100} = 1.2$$

$$\text{Cost to reach } S7: \text{cost} = \frac{(0.6)1000}{3000} + \frac{(1-0.6)150}{100} = 0.8$$

Because the cost to reach the application server S7 in third LDN 226 is the lowest relative to the cost to reach the application server S4 in the second LDN 224 and the cost to reach the application server S1 in the first LDN 222, the application server S7 is selected and the new flow of packets is routed toward the third egress router 220.

There are two scenarios. In scenario a), the network controller is informed of which routers (by router ID or IP address) that a specific application server instance is attached. Those routers could be the gateway routers to the mini data centers where the application instance is hosted. In scenario b), the network controller is not configured or given the information on where and how application server instances are attached. This scenario needs the network to intelligently discover the application instance egress routers. For one application server, there could be multiple "application instance egress routers" located in different regions or 5G LDNs.

For the scenario a) above, the network delay to reach the application server instance, or RTT, can be measured by the ingress router (either the logical function within the PSA or a router directly connected to the 5G PSA) sending ping requests to the application instance egress routers, and the routers reply to the ping request. The Ingress router can measure the time lapse between the ping request and ping reply and record it as the RTT at Time T.

Using time laps between ping and ping reply may not be accurate in measuring the RTT of application data packets between two routers because there might be multiple paths between the two routers and ping message might traverse different paths than the actual data packets.

A more accurate RTT measurement for data packets through the network is via attaching a metadata to the actual packets. The metadata include a time stamp (or a sequence number if the ingress router can map the sequence number to an actual time). The application instance routers that receives the packets with the metadata needs to extract the metadata and send the extracted metadata back to the sender.

Since application data packets will only send to one application instance egress router, the ping and ping reply RTT measurement is used on periodically basis, when there is no application data packets available, to measure the RTT to all other application egress routers for the instances that are not best route based on the forwarding table by routing protocols.

For the Scenario b) above, the network needs to discover which router(s) has the application server instances attached. Below is the method to discover all the application instance egress routers for a specific application.

Mini data center Gateway router or routers periodically send reverse address resolution protocol (ARP) IP version 4 (IPv4) or neighbor discovery scan with the address of the application server address to discover if the application server instances are hosted in the edge data center. If yes, the router or routers are identified as the Application Instance Egress Router (or Routers) for the application.

Each DC Gateway router needs to advertise its attached Application Instance via extended routing protocols (IGP and BGP) to other relevant LDNs and all routers in the network. The built-in distribution of the routing protocols can distribute the attachment information to routers in other regions as well.

It worth noting that when multiple instances are instantiated in edge data centers close in proximity, the network routing protocol might not create big enough cost difference for reaching instances in different edge data centers for 5G edge services. Under this circumstance, the network controller injects additional cost metrics to the route reaching each instance to prevent packets of one flow from being forwarded to different instances, which can degrade the application communication because of the oscillation of packet delivery for one flow. A detailed mechanism on how the network controller injects cost to different routes is not provided herein.

In an embodiment, each application server might be used by a small group of UEs. Therefore, it is not necessary for egress router to advertise all the IP layer metrics to all routers. Likewise, each edge computing (EC) Data Center gateway router may only have a small number of EC instances.

"Application Bound Group Routers" is used to refer the group of routers that are interested in a group of specific anycast addresses. The Network (IP) Layer Metrics for an EC Server Instance should be advertised among the routers in the "Application bound Group Routers."

BGP RT Constrained Distribution, which is described in IETF document RFC4684 entitled "Constrained Route Distribution for Border Gateway Protocol/MultiProtocol Label Switching (BGP/MPLS) Internet Protocol (IP) Virtual Private Networks (VPNs)" by P. Marques, et al., published November 2006, can be used to form the "Application Bound Group."

Since there are usually much more EC/Application servers than the number of routers in 5G LDN, a more practical way to form the "Application Bound Group" is for each ingress router to query a network controller upon receiving the first packet to a specific anycast address to be included in the "Application Bound Group Routers." There should be a timer associated with the ingress router, as the UE that uses the EC service might move away. When the timer expires, the ingress router is removed from the "Application Bound Group of Routers."

The 5G network is connected to many small Local Data Networks (LDN) where application servers are instantiated. Each LDN can have multiple other LDNs close in proximity. When an application server has multiple instances in different LDNs, sometimes, there is better performance if the traffic of the application from the UE is sent to the application server instance in a neighboring LDN, instead of its closest LDN.

Especially when a UE moves from one 5G Local Access Radio Network to another, the traffic performance can be better if connecting with the application server instance in the old LDN, instead of switching over to the application server instance in the new LDN, due to some of the following reasons. The new LDN could be overloaded, longer network delay to reach the application server instance. The application server instance in the new LDN is overloaded by high demand, such as there are parties or other gathering events in the area. For a specific application, its instances may be only instantiated in a subset of LDNs. For the ease of description, this set of LDNs is called the Application-Bound Neighboring Group for this specific application. Application A's Neighboring Group can be different from Application B's Neighboring Group. Application-Bound Neighboring Group is discovered by extension to Routing protocol, such as BGP.

Assuming external border gateway protocol (eBGP) is running between LDNs, if the boarding router can add a very large cost value when propagate the received route update from neighboring LDNs across its own LDN to another neighboring LDNs, all the routers can easily calculate if a specific application address is within its own LDN, its immediate neighboring LDN, or multiple LDNs away. By this approach, application-bound neighboring group can be formed.

One application can have its instances instantiated in different geographic regions, such as different countries or continents. Below is an algorithm to fine tune the application bound neighboring group to exclude instances in too far away regions. Some instances can be manually removed because of the obvious geographic distances.

Assume LDN-Neighbor[App-i] is a group of neighboring LDNs which have the Application App-i instantiated. Each PSA, say PSA-a, measures the network performance to a list of PSAs in all the LDN-Neighbor [App-i].

Current-LDN-Neighbor[App-i] is the current Application-Bound Neighboring Group for the Application "App-i".

```
While (TRUE)
{
  For (j=1; j< total-number-of-LDNs; j++)
    {
    If (the network RTT between PSA-a and PSA in LDN-Neighbor[j]) > K //*K is a
    configured parameter *//
    then {remove the PSA[j] from the current-LDN-Neighbor[App-i]};
    Else
    { If the PSA[j] is not in the current-LDN-Neighbor[App-i]
    Then add PSA[j] to the current-LDN-Neighbor[App-i];
    }
    Wait-Timer-t( ); //*pre-configured timer to wait before making changes to the list*//
}
```

Anycast used in 5G Edge computing environment is slightly different from the typical anycast address being deployed. Typical anycast address is used to represent instances in vast different geographical locations, such as different continents. Anycast address for "app.net" for Asia lead packets to a server instance of "app.net" hosted in Asia.

5G Edge Computing environment can have multiple instances of one Edge Computing server hosted in multiple mini Edge Computing DCs close in proximity. Routers, i.e., the ingress router to Local Data Network, can forward packets for the anycast address of "app.net" to different egress routers that have "app.net" instances attached.

If "app.net" have 4 instances in four different 5G Edge Computing Data Center. All those 4 instances have the same anycast address. The RTT to "app.net" anycast address should be a group of values (instead of one RTT value to a unicast address). The value should reference the egress router's specific address (i.e., the loopback address) to which the instance is attached.

RTT to "app.net" ANYCAST Address is represented as:
    List of {Egress Router Loopback address, RTT value}
    This list is called "RTT-ANYCAST".

In order to better optimize the anycast traffic, each router adjacent to 5G PSA needs to periodically measure RTT to a list of egress routers that advertise the anycast address. The RTT to egress router at Site-i is considered as the RTT to the anycast instance at the Site-i.

In order to better optimize the anycast traffic, each PSA uses the method disclosed herein to discover the list of routers in the Application-Bound Neighboring Group that have the Application server Instances directly attached. Each PSA needs to perform this RTT measure periodically to each of those routers and refresh its measure.

Since network doesn't have access to application server instance internal logic, this section describes a method to passively measure the application server instance workload.

Even though this method is not as accurate comparing with application servers themselves reporting their own workload, this method provides an intelligent estimate without the cooperation from the applications or the corresponding application controllers.

The detailed procedure is detailed below.

For a specific application, which is matched by the address of the application server instance, the Application Instance Egress Router (AIER), like egress router 116 in FIG. 1, measures the amount of traffic destined towards the address & the amount of the traffic from the specific address.

Total number of packets to the Instance
    Total number of packets from the Instance
    Total number of Bytes to the Instance
    Total number of bytes from the Instance All the AIERs in the Application-Bound-Neighboring-Group report the above measurements in different time spans.
    Either by sending standalone message to controller, or
    Tag into client route BGP UPDATE.
    The time span can be BGP UPDATE frequency if BGP Update is used to propagate the measurement, or configured time span, such as 1 minute total, 15 minutes total, hourly total, and 24 hours total, to its corresponding network controller or propagate to ingress nodes.

Note: A Load Index can be actual packet amounts (To and From traffic separately) in a specific time span, say 15 minutes or 24 hours, or a ratio of the Packet amount divided by a fixed value.

The disclosed procedure is to equalize the traffic towards multiple instances with the same edge server based on the following attributes.

traffic load to an instance in a LDN or Load Index, as described above
    capacity index,
    Site Preference Index, and
    network delay, as described above.

For any specific application, its deployment in different regions or data centers for 5G Edge services can have different capacity. Some data centers can have hundreds, or thousands, of instances connected to a front-end Application Load Balancer which is reachable from external clients. Other data centers can have very small number of instances for the application. "Capacity Index", which is a numeric number 1-10, is used to represent the capacity of the application server in a specific location. The capacity index for any specific application server at a specific location is provided by the Application Controller. If the capacity index is not given, the default is 5 for all locations.

Here is the algorithm in determining cost for the traffic towards specific anycast instance.

$$\text{cost} = \min_j \frac{\alpha L_j \beta_i}{L_i \beta_j} + \frac{(1-\alpha) D_j \gamma_i}{D_i \gamma_j}$$

where $\alpha$ represents the weighting factor and has a value between zero and one (if smaller than 0.5, network latency has more influence; otherwise, server load and capacity have more influence), $L_i$ represents the first load measurement (e.g., total bytes/packets sent to/received from the server), $L_j$ represents the second load measurement, $\beta_i$ represents the first capacity index (larger value means higher capacity), $\beta j$ represents the second capacity index, $D_i$ represents the first network latency (e.g., RTT between the two edge routers between client and server. For 5G, the RTT between PSA and application instance egress router), $D_j$ represents the second network latency, $\gamma_i$ represents the first network preference (e.g., larger value means higher preference, and some LDNs may have higher capacity in terms or router's capacity and/or bandwidth capacity than other LDNs; can have a value of between one and ten; may be configured by the network controller to indicate the preference of the LDN, and if not configured, has a default value of five), $\gamma_j$ represents the second network preference.

Load and Delay need Moving Average count is as follows.
the moving average (MA) of Node i's server load measurement l_i, which is L_i, and the moving average (MA) of Node i's network RTT measurement d_i, which is D_i.
l_i is the counter of bytes to and from the server from Node i in a measurement cycle.
d_i is the edge-to-edge RTT for flows on the path from Node i
Assume Node i receives L_j and D_j from all the neighbors periodically
When a new flow, f, arrives at Node i, Node i will forward the flow to the application instance with the smallest cost A. An example of how the algorithm works (without consideration of capacity index and network preference value) was provided above with regard to FIG. 3.

Figure 3:
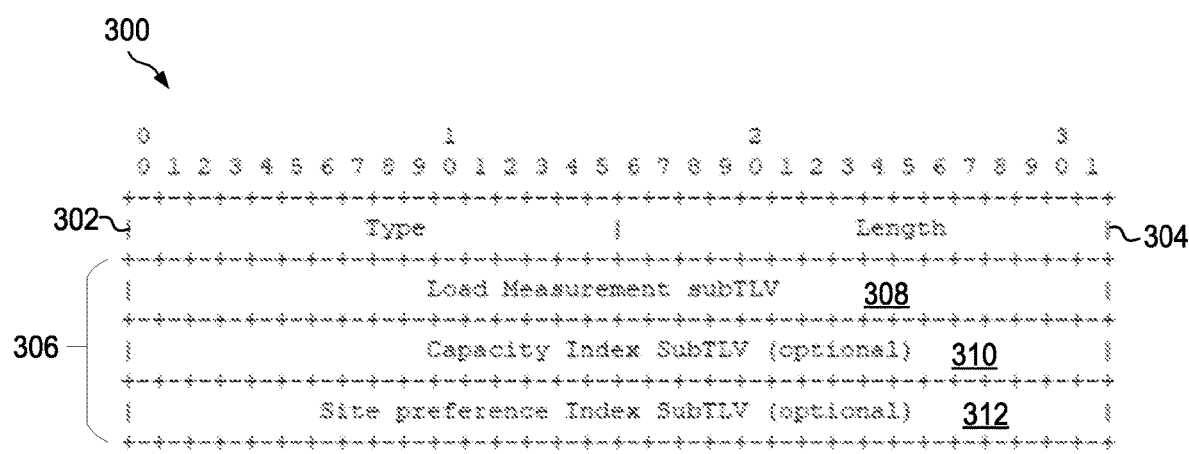
FIG. 3 is a type length value (TLV) structure that may be used to signal a load measurement, a capacity index, and network preference according to an embodiment of the disclosure.

FIG. 3 is a type length value (TLV) structure 300 that may be used to signal the load measurement, the capacity index, and the network preference discussed above. In an embodiment, the TLV structure 300 is a switching capability specific information (SCSI) TLV as defined in Internet Engineering Task Force (IETF) document Request for Comments (RFC) 8258 entitled "Generalized SCSI: A Generic Structure for Interface Switching Capability Descriptor (ISCD) Switching Capability Specific Information (SCSI)" by D. Ceccarelli, et al., published October 2017. In an embodiment, the TLV structure 300 may be encoded into an update message, a BGP update message, or other type of message. In an embodiment, the TLV structure 300 is transmitted by an egress router (e.g., the first egress router, 216, the second egress router 218, or the third egress router 220) to an ingress router (e.g., the first ingress router 210, the second ingress router 212, or the third ingress router 213).

As shown, the TLV structure 300 includes a type field 302, a length field 304, and a value field 306. The type field 302 is a 16-bit field used to identify the type and structure of the information in the value field 306. The length field 304 is a 16-bit field that indicates the length of the value field 306 in octets (e.g., bytes). The length field 304 is either zero a multiple of four octets, dependent on the number or amount of information in the value field 306.

The value field 306 includes a load measurement subTLV structure 308, a capacity index subTLV structure 310, and a site preference index subTLV structure 312. The load measurement subTLV structure 308 is configured to carry the load measurement discussed above. The capacity index subTLV structure 310 is configured to carry the capacity index discussed above. The site preference index subTLV structure 312 is configured to carry the network preference discussed above. As shown in FIG. 3, the capacity index subTLV structure 310 and a site preference index subTLV structure 312 may be optional when, for example, the simplified formula discussed above is utilized.

Figure 4:
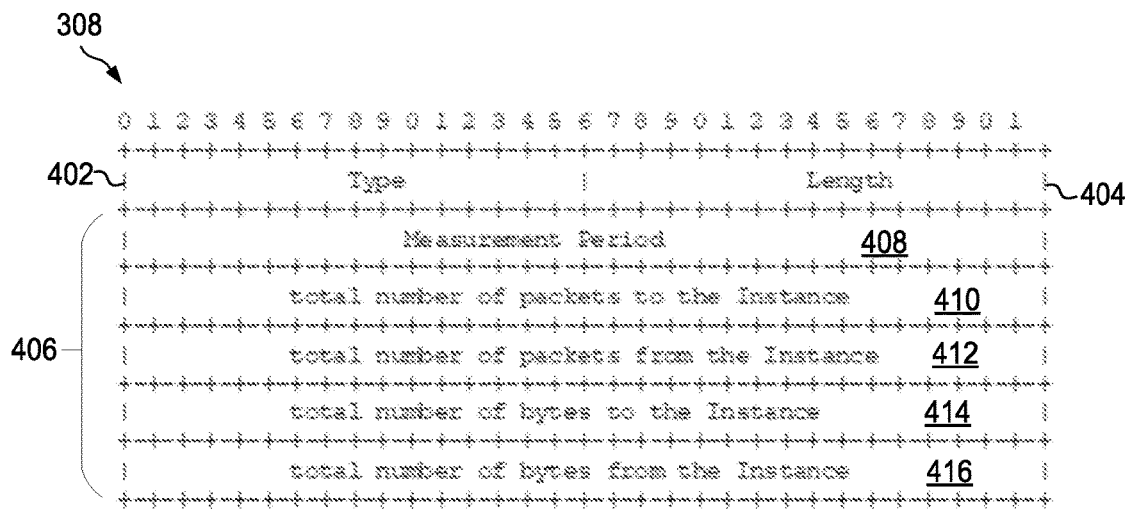
FIG. 4 is a load measurement subTLV structure included within the TLV structure of FIG. 3.

FIG. 4 is the load measurement subTLV structure 308 included within the TLV structure of FIG. 3 in additional detail. As shown, the load measurement subTLV structure 308 includes a type field 402, a length field 404, and a value field 406. The type field 402 is a 16-bit field used to identify the type and structure of the information in the value field 406. In an embodiment, the type field 402 has a value of one to indicate an accumulative number of packets since the last message (e.g., BGP update message). In an embodiment, the type field 402 has a value of one to indicate a user-specified time period, which may be coarser than when the type has a value of one. The length field 404 is a 16-bit field that indicates the length of the value field 406 in octets (e.g., bytes).

The value field 406 includes a measurement period field 408, a total number of packets to the instance field 410, a total number of packets from the instance field 412, a total number of bytes to the instance field 414, and a total number of bytes from the instance field 416. The measurement period field 408 comprises a default value based on a BGP update period.

The total number of packets to the instance field 410 indicates the total number of packets sent to an application server, as described above. The total number of packets from the instance field 412 indicates the total number of packets received from an application server, as described above. The total number of bytes to the instance field 414 indicates the total number of bytes sent to an application server, as described above. The total number of bytes from the instance field 416 indicates the total number of bytes received from an application server, as described above.

Figure 5:
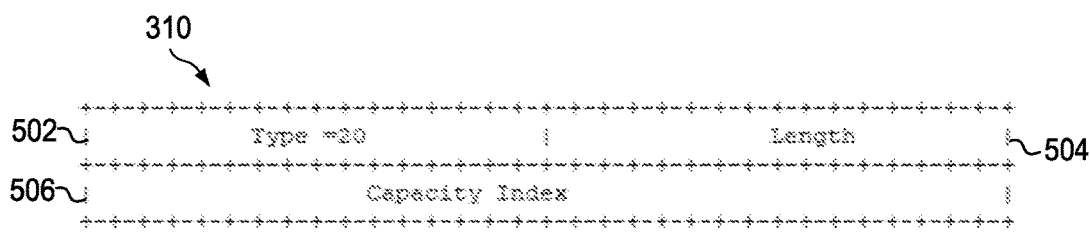
FIG. 5 is a capacity index subTLV structure included within the TLV structure of FIG. 3.

FIG. 5 is the capacity index subTLV structure 310 included within the TLV structure of FIG. 3 in additional detail. As shown, the capacity index subTLV structure 310 includes a type field 502, a length field 504, and a value field 506. The type field 502 is a 16-bit field used to identify the type and structure of the information in the value field 506. In an embodiment, the type field 502 may have a value of twenty. The length field 504 is a 16-bit field that indicates the length of the value field 506 in octets (e.g., bytes). The value field 506 carries the capacity index, as described above. Because the capacity index may be a more stable value than, for example, the load of an application server, the capacity index subTLV structure 310 may not be included in each message from the egress router to the ingress router.

Figure 6:
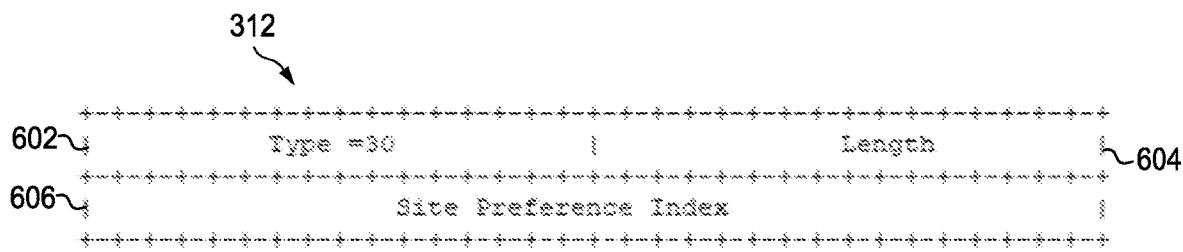
FIG. 6 is a site preference index subTLV structure included within the TLV structure of FIG. 3.

FIG. 6 is the site preference index subTLV structure 312 included within the TLV structure of FIG. 3 in additional detail. As shown, the site preference index subTLV structure 312 includes a type field 602, a length field 604, and a value field 606. The type field 602 is a 16-bit field used to identify the type and structure of the information in the value field

606. In an embodiment, the type field 602 may have a value of thirty. The length field 604 is a 16-bit field that indicates the length of the value field 606 in octets (e.g., bytes). The value field 606 carries the network preference, as described above. Because the network preference may be a more stable value than, for example, the load of an application server, the site preference index subTLV structure 312 may not be included in each message from the egress router to the ingress router.

Figure 7:
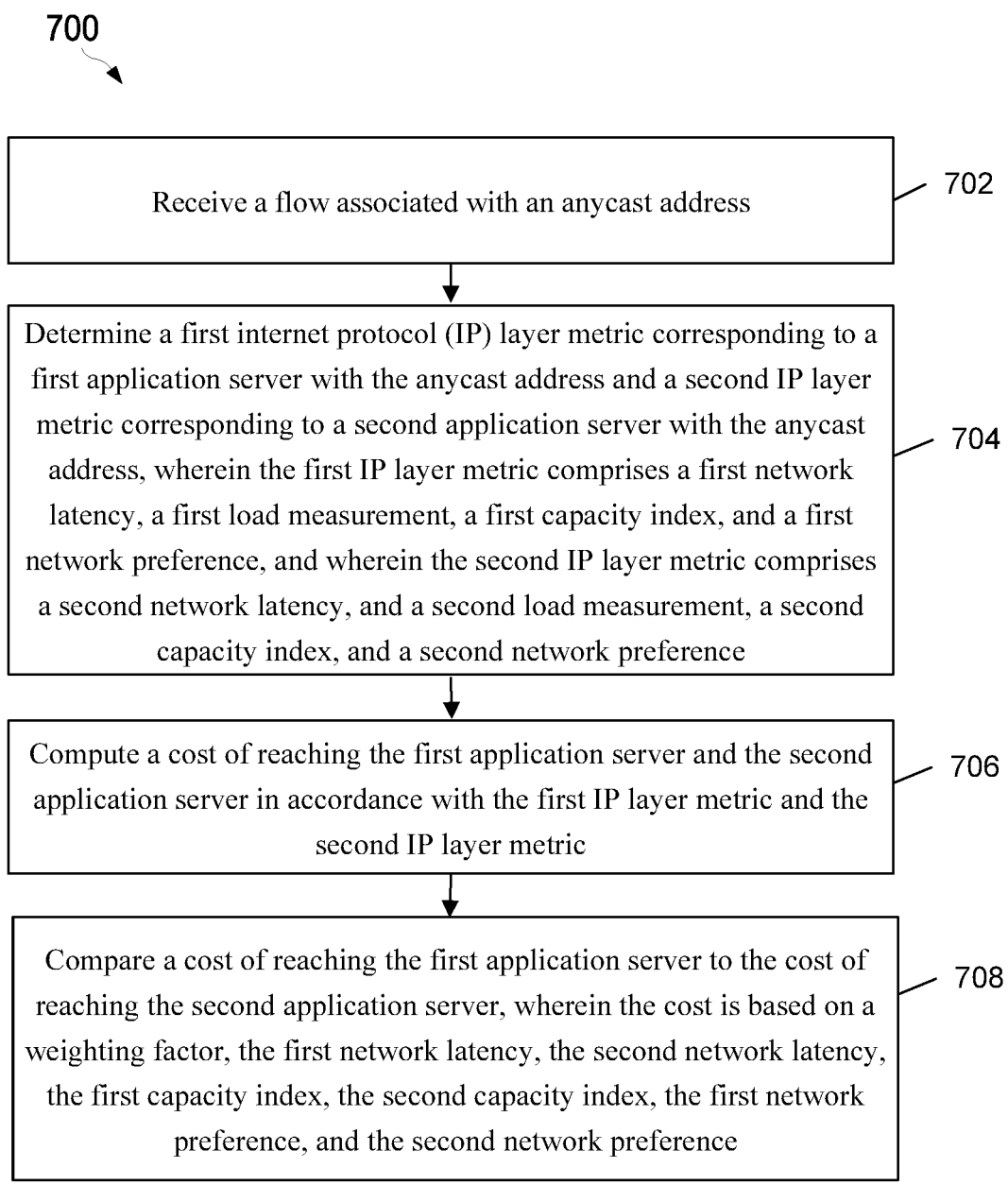
FIG. 7 is a method of routing implemented by an ingress router according to an embodiment of the disclosure.

FIG. 7 is a method 700 of routing implemented by an ingress router (e.g., the first ingress router 210) according to an embodiment of the disclosure. The method 700 may be implemented to route a new flow of packets to the best or optimal application server.

In block 702, the first ingress router (e.g., first ingress router 210) receives a flow associated with an anycast address.

In block 704, the first ingress router determines a first internet protocol (IP) layer metric corresponding to a first application server with the anycast address and a second IP layer metric corresponding to a second application server with the anycast address. In an embodiment, the first IP layer metric comprises a first network latency, a first load measurement, a first capacity index, and a first network preference. In an embodiment, the second IP layer metric comprises a second network latency, and a second load measurement, a second capacity index, and a second network preference.

In block 706, the first ingress router computes a cost of reaching the first application server and the second application server in accordance with the first IP layer metric and the second IP layer metric.

In block 708, the first ingress router selects a path from a first path connected to the first application server and a second path connected to the second application server based on the cost computed.

In an embodiment, the first egress router receives a first border gateway protocol (BGP) message comprising at least part of the first IP layer metric from a first egress router connected by the first path to the first application server. In an embodiment, the first ingress router receives a second border gateway protocol (BGP) message comprising at least part of the second IP layer metric from a second egress router connected by the second path to the second application server.

In an embodiment, the first ingress router receives a second border gateway protocol (BGP) message comprising at least part of the second IP layer metric from an ingress router of the second path. In an embodiment, the cost is determined according to:

$$\frac{\alpha L_j \beta_i}{L_i \beta_j} + \frac{(1-\alpha)D_j \gamma_i}{D_i \gamma_j}$$

where $\alpha$ represents the weighting factor and has a value between zero and one, $L_i$ represents the first load measurement, $L_j$ represents the second load measurement, $\beta_i$ represents the first capacity index, $\beta_j$ represents the second capacity index, $D_i$ represents the first network latency, $D_j$ represents the second network latency, $\gamma_i$ represents the first network preference, $\gamma_j$ represents the second network preference.

In an embodiment, the first network latency and the second network latency each comprise a round trip time (RTT). In an embodiment, the first network latency and the second network latency are each measured by an ingress router of a corresponding path of the first path and the second path. In an embodiment, the first network latency and the second network latency are each measured by an egress router of a corresponding path of the first path and the second path.

In an embodiment, the first load measurement and the second load measurement each comprise a weighted combination of a total number of packets sent by an egress node to an application server, the total number of packets received by the egress node from the application server, a total number of bytes sent by the egress node to the application server, and the total number of bytes received by the egress node from the application server.

Figure 8:
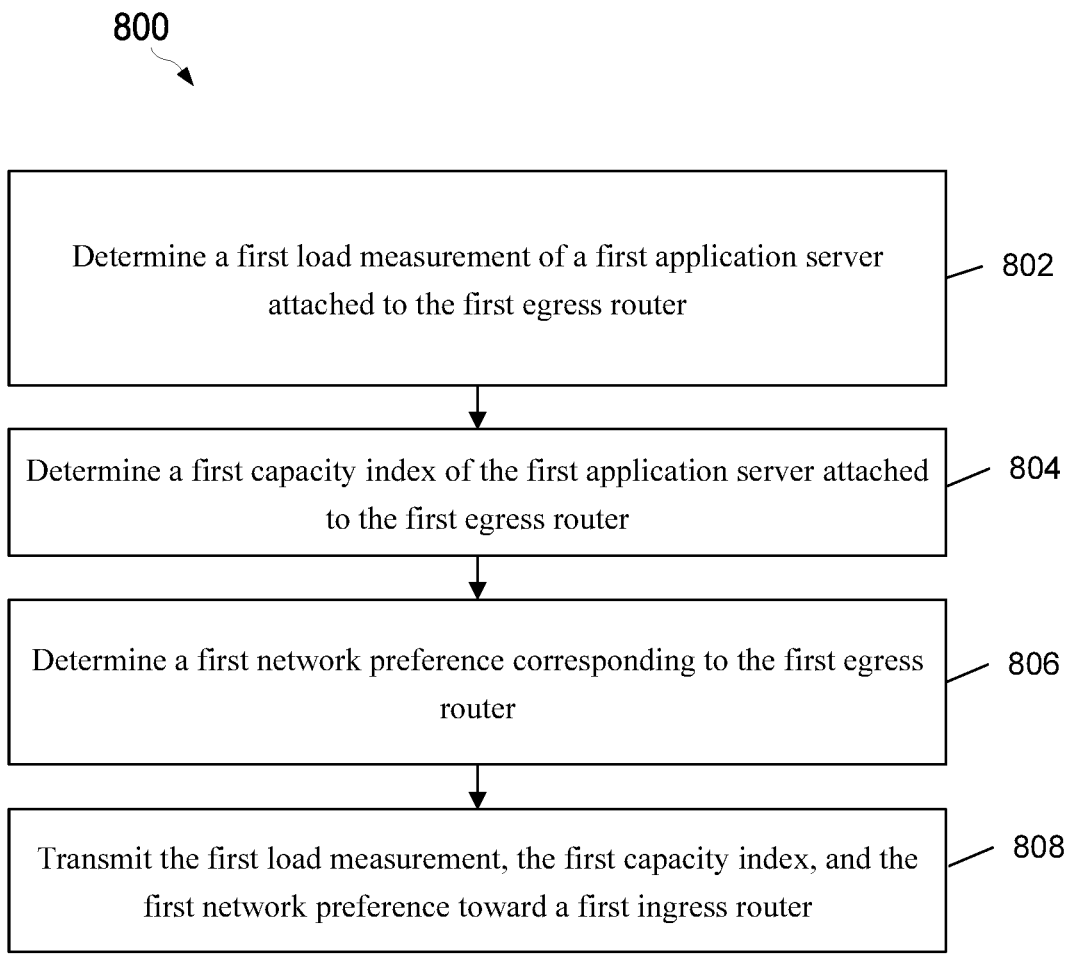
FIG. 8 is a method of routing implemented by an egress router according to an embodiment of the disclosure.

FIG. 8 is a method 800 of routing implemented by an egress router (e.g., the first egress router 216) according to an embodiment of the disclosure. The method 800 may be implemented to provide information to an ingress router (e.g., first ingress router 210) so that the ingress router can determine the best or optimal application server to receive a new flow of packets.

In block 802, a first load measurement of a first application server (e.g., S 1) attached to the first egress router is determined. In block 804, a first capacity index of the first application server attached to the first egress router is determined. In block 806, a first network preference corresponding to the first egress router is determined. In block 808, the first load measurement, the first capacity index, and the first network preference are transmitted toward the first ingress router.

In an embodiment, the first load measurement, the first capacity index, and the first network preference are transmitted in a TLV structure (e.g., TLV structure 300). In an embodiment, the TLV structure includes a load measurement subTLV structure (e.g., the load measurement subTLV structure 308) containing the first load measurement. In an embodiment, the load measurement subTLV structure contains a total number of packets sent by an egress node to an application server, the total number of packets received by the egress node from the application server, a total number of bytes sent by the egress node to the application server, and the total number of bytes received by the egress node from the application server.

In an embodiment, the first load measurement comprises a weighted (e.g., w1) combination of a total number of packets sent by an egress node to an application server, the total number of packets received by the egress node from the application server, a total number of bytes sent by the egress node to the application server, and the total number of bytes received by the egress node from the application server.

In an embodiment, the TLV structure includes a capacity index subTLV structure (e.g., the capacity subTLV structure 310) containing the first capacity index. In an embodiment, the TLV structure includes a network preference subTLV structure (e.g., the site preference index subTLV structure 312) containing the first network preference.

Figure 9:
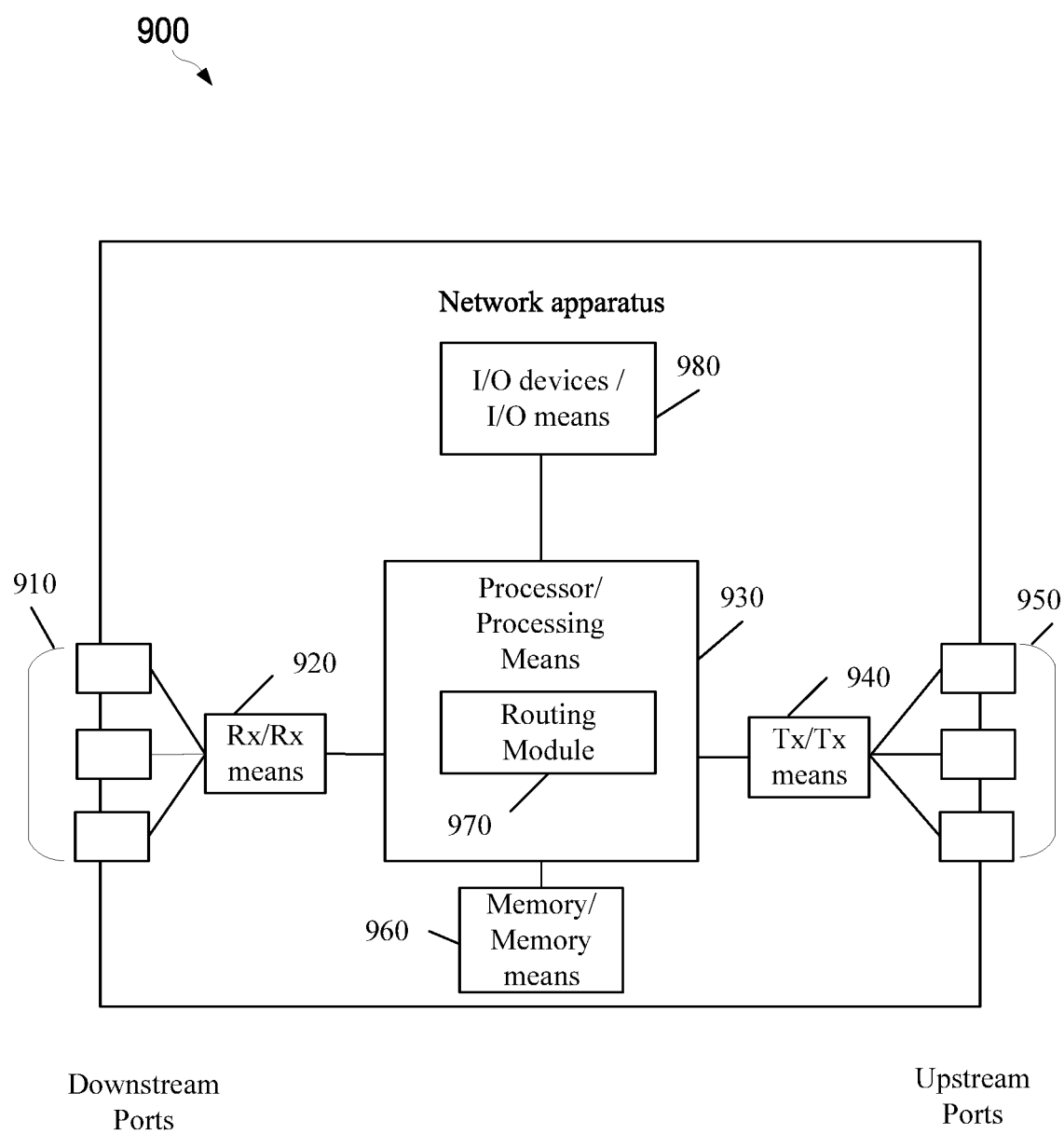
FIG. 9 is a schematic diagram of a network apparatus according to an embodiment of the disclosure.

FIG. 9 is a schematic diagram of a network apparatus 900 (e.g., an ingress router, an egress router, a network device, etc.). The network apparatus 900 is suitable for implementing the disclosed embodiments as described herein. The network apparatus 900 comprises ingress ports/ingress means 910 and receiver units (Rx)/receiving means 920 for receiving data; a processor, logic unit, or central processing unit (CPU)/processing means 930 to process the data; transmitter units (Tx)/transmitting means 940 and egress ports/egress means 950 for transmitting the data; and a memory/memory means 960 for storing the data. The network apparatus 900 may also comprise optical-to-electrical (OE) components and electrical-to-optical (EO) components coupled to the ingress ports/ingress means 910, the receiver units/receiving means 920, the transmitter units/transmitting means 940, and the egress ports/egress means 950 for egress or ingress of optical or electrical signals.

The processor/processing means 930 is implemented by hardware and software. The processor/processing means 930 may be implemented as one or more CPU chips, cores (e.g., as a multi-core processor), field-programmable gate arrays (FPGAs), application specific integrated circuits (ASICs), and digital signal processors (DSPs). The processor/processing means 930 is in communication with the ingress ports/ingress means 910, receiver units/receiving means 920, transmitter units/transmitting means 940, egress ports/egress means 950, and memory/memory means 960. The processor/processing means 930 comprises a routing module 970. The routing module 970 is able to implement the methods disclosed herein. The inclusion of the routing module 970 therefore provides a substantial improvement to the functionality of the network apparatus 900 and effects a transformation of the network apparatus 900 to a different state. Alternatively, the routing module 970 is implemented as instructions stored in the memory/memory means 960 and executed by the processor/processing means 930.

The network apparatus 900 may also include input and/or output (I/O) devices/I/O means 980 for communicating data to and from a user. The I/O devices I/O means 980 may include output devices such as a display for displaying video data, speakers for outputting audio data, etc. The I/O devices I/O means 980 may also include input devices, such as a keyboard, mouse, trackball, etc., and/or corresponding interfaces for interacting with such output devices.

The memory/memory means 960 comprises one or more disks, tape drives, and solid-state drives and may be used as an over-flow data storage device, to store programs when such programs are selected for execution, and to store instructions and data that are read during program execution. The memory/memory means 960 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A first ingress router, comprising:
a memory; and
one or more processors configured to execute instructions stored in the memory to cause the first ingress router to:
receive a flow associated with an anycast address;
compute a cost of reaching a first application server via a first path and a second application server via a second path in accordance with a first internet protocol (IP) layer metric corresponding to the first application server with the anycast address and a second IP layer metric corresponding to the second application server with the anycast address, respectively, wherein the first IP layer metric comprises one or more of a first network latency, a first load measurement, a first capacity index, and a first network preference as weighted, and wherein the second IP layer metric comprises one or more of a second network latency, a second load measurement, a second capacity index, and a second network preference as weighted; and
select either the first path or the second path based on the cost computed,
wherein the first load measurement and the second load measurement each comprise a weighted combination of a total number of packets sent by an egress node to an application server, the total number of packets received by the egress node from the application server, a total number of bytes sent by the egress node to the application server, and the total number of bytes received by the egress node from the application server.

2. The first ingress router of claim 1, wherein the instructions further cause the first ingress router to:
receive a first border gateway protocol (BGP) message comprising at least part of the first IP layer metric from a first egress router connected by the first path to the first application server.

3. The first ingress router of claim 1, wherein the instructions further cause the first ingress router to:
receive a second border gateway protocol (BGP) message comprising at least part of the second IP layer metric from a second egress router connected by the second path to the second application server.

4. The first ingress router of claim 1, wherein the instructions further cause the first ingress router to:
receive a second border gateway protocol (BGP) message comprising at least part of the second IP layer metric from an ingress router of the second path.

5. The first ingress router of claim 1, wherein the cost is determined according to:

$$\frac{\alpha L_j \beta_i}{L_i \beta_j} + \frac{(1-\alpha) D_j \gamma_i}{D_i \gamma_j}$$

where $\alpha$ represents a weighting factor and has a value between zero and one, $L_i$ represents the first load measurement, $L_j$ represents the second load measurement, $\beta_i$ represents the first capacity index, $\beta_j$ represents the second capacity index, $D_i$ represents the first network latency, $D_j$ represents the second network latency, $\gamma_i$ represents the first network preference, $\gamma_j$ represents the second network preference.

6. The first ingress router of claim 1, wherein the first network latency and the second network latency each comprise a round trip time (RTT).

7. The first ingress router of claim 1, wherein the first network latency and the second network latency are each measured by an ingress router of a corresponding path of the first path and the second path.

8. The first ingress router of claim 1, wherein the first network latency and the second network latency are each measured by an egress router of a corresponding path of the first path and the second path.

9. A method of routing implemented by a first ingress router, comprising:
receiving a flow associated with an anycast address;
computing a cost of reaching a first application server via a first path and a second application server via a second path in accordance with a first internet protocol (IP) IP layer metric corresponding to the first application server with the anycast address and a second IP layer metric corresponding to the second application server with the anycast address, respectively, wherein the first IP layer metric comprises one or more of a first network latency, a first load measurement, a first capacity index, and a first network preference as weighted, and wherein the second IP layer metric comprises one or more of a second network latency, a second load measurement, a second capacity index, and a second network preference as weighted; and
selecting either the first path or the second path based on the cost computed,
wherein the cost is determined according to:

$$\alpha L_j\beta_i+(1-\alpha)D_j\gamma_i$$

where $\alpha$ represents a weighting factor and has a value between zero and one, $L_i$ represents the first load measurement, $L_j$ represents the second load measurement, $\beta_i$ represents the first capacity index, $\beta_j$ represents the second capacity index, $D_i$ represents the first network latency, $D_j$ represents the second network latency, $\gamma_i$ represents the first network preference, $\gamma_j$ represents the second network preference.

10. The method of claim 9, further comprising receiving a first border gateway protocol (BGP) message comprising at least part of the first IP layer metric from a first egress router connected by the first path to the first application server.

11. The method of claim 9, further comprising receiving a second border gateway protocol (BGP) message comprising at least part of the second IP layer metric from a second egress router connected by the second path to the second application server.

12. The method of claim 9, further comprising receiving a second border gateway protocol (BGP) message comprising at least part of the second IP layer metric from an ingress router of the second path.

13. The method of claim 9, wherein the first network latency and the second network latency each comprise a round trip time (RTT).

14. The method of claim 9, wherein the first network latency and the second network latency are each measured by an ingress router of a corresponding path of the first path and the second path.

15. The method of claim 9, wherein the first network latency and the second network latency are each measured by an egress router of a corresponding path of the first path and the second path.

16. The method of claim 9, wherein the first load measurement and the second load measurement each comprise a weighted combination of a total number of packets sent by an egress node to an application server, the total number of packets received by the egress node from the application server, a total number of bytes sent by the egress node to the application server, and the total number of bytes received by the egress node from the application server.

17. A first egress router, comprising:
a memory; and
one or more processors configured to execute instructions stored in the memory to cause the first egress router to:
determine a first load measurement of a first application server attached to the first egress router;
determine a first capacity index of the first application server attached to the first egress router;
determine a first network preference corresponding to the first egress router; and
transmit the first load measurement, the first capacity index, and the first network preference as weighted toward a first ingress router,
wherein a load measurement subTLV structure in the TLV structure contains a total number of packets sent by an egress node to an application server, the total number of packets received by the egress node from the application server, a total number of bytes sent by the egress node to the application server, and the total number of bytes received by the egress node from the application server.

18. The first egress router of claim 17, wherein the first load measurement, the first capacity index, and the first network preference are transmitted in a type length value (TLV) structure.

19. The first egress router of claim 17, wherein the first load measurement comprises a weighted combination of a total number of packets sent by the egress node to the application server, the total number of packets received by the egress node from the application server, a total number of bytes sent by the egress node to the application server, and the total number of bytes received by the egress node from the application server.

20. A method of routing implemented by a first egress router, comprising:
determining a first load measurement of a first application server attached to the first egress router;
determining a first capacity index of the first application server attached to the first egress router;
determining a first network preference corresponding to the first egress router; and
transmitting the first load measurement, the first capacity index, and the first network preference as weighted toward a first ingress router,
wherein the first load measurement comprises a weighted combination of a total number of packets sent by an egress node to an application server, the total number of packets received by the egress node from the application server, a total number of bytes sent by the egress node to the application server, and the total number of bytes received by the egress node from the application server.

21. The method of claim 20, wherein the first load measurement, the first capacity index, and the first network preference are transmitted in a type length value (TLV) structure.

22. The method of claim 21, wherein a load measurement subTLV structure in the TLV structure contains a total number of packets sent by the egress node to the application server, the total number of packets received by the egress node from the application server, a total number of bytes sent by the egress node to the application server, and the total number of bytes received by the egress node from the application server.

* * * * *

UNITED STATES PATENT AND TRADEMARK OFFICE
CERTIFICATE OF CORRECTION

Page 1 of 1

PATENT NO.      : 12,476,896 B2
APPLICATION NO. : 18/304016
DATED           : November 18, 2025
INVENTOR(S)     : Linda Dunbar et al.

It is certified that error appears in the above-identified patent and that said Letters Patent is hereby corrected as shown below:

In the Claims

Column 23, Claim 9, Line 8, delete "path in accordance with a first internet protocol (IP) IP" and insert --path in accordance with a first internet protocol (IP)--.

Column 23, Claim 9, Lines 23-24, delete "$\dfrac{\alpha L_j \beta_i}{} + \dfrac{(1-\alpha)D_j \gamma_i}{}$" and insert --$\dfrac{\alpha L_j \beta_i}{L_i \beta_j} + \dfrac{(1-\alpha)D_j \gamma_i}{D_i \gamma_j}$--.

Signed and Sealed this
Thirteenth Day of January, 2026

John A. Squires
*Director of the United States Patent and Trademark Office*